US006708041B1

United States Patent
Butovitsch et al.

(10) Patent No.: US 6,708,041 B1
(45) Date of Patent: Mar. 16, 2004

(54) BASE STATION TRANSMIT POWER CONTROL IN A CDMA CELLULAR TELEPHONE SYSTEM

(75) Inventors: Peter Butovitsch, Bromma (SE); Peter B. Andersson, Kista (SE)

(73) Assignee: Telefonaktiebolaget LM (publ), Stockholm (SE)

( * ) Notice: Subject to any disclaimer, the term of this patent is extended or adjusted under 35 U.S.C. 154(b) by 0 days.

(21) Appl. No.: 09/189,629

(22) Filed: Nov. 10, 1998

Related U.S. Application Data (60) Provisional application No. 60/090,236, filed on Jun. 22, 1998, and provisional application No. 60/069,511, filed on Dec. 15, 1997.

(51) Int. Cl.$^7$ ............................................. H04Q 7/20
(52) U.S. Cl. ........................ 455/522; 455/438; 455/423; 370/318; 370/320
(58) Field of Search ...................... 455/482, 423, 455/435, 438, 436, 439, 442, 517, 522, 561, 566, 132, 133, 134, 13.4, 127.1; 370/317, 318, 320

(56) References Cited

U.S. PATENT DOCUMENTS

| | | | |
|---|---|---|---|
| 4,485,486 A | * 11/1984 | Webb et al. ................ 455/450 |
| 5,056,109 A | 10/1991 | Gilhousen et al. | |
| 5,107,487 A | 4/1992 | Vilmur et al. | |
| 5,109,390 A | * 4/1992 | Gilhousen et al. .......... 455/450 |
| 5,267,262 A | 11/1993 | Wheatley, III | |

(List continued on next page.)

FOREIGN PATENT DOCUMENTS

| EP | 0 680 160 A | 11/1995 |
|---|---|---|
| EP | 0 682 419 A | 11/1995 |
| EP | 0 809 365 A | 11/1997 |
| EP | 0 940 930 A | 9/1999 |
| WO | 96/08119 A | 3/1996 |
| WO | 97/02665 | 1/1997 |
| WO | 97/26716 A | 7/1997 |
| WO | WO 98/56120 | 10/1998 |
| WO | 99/08398 A | 2/1999 |
| WO | 99/31819 A | 6/1999 |
| WO | 99/52310 A | 10/1999 |

OTHER PUBLICATIONS

A. Salmasi et al.: "On the System Design Aspects of Code Division Multiple Access (CDMA) Applied to Digital Cellular and Personal Communications Networks," Gateway to the Future—Technology in Motion, St. Louis, May 19–22, 1991, No. Conf. 41, May 19, 1991, pp. 57–62, XP000260154, Institute of Electrical and Electronics Engineers.

(List continued on next page.)

*Primary Examiner*—Congvan Tran
(74) *Attorney, Agent, or Firm*—Nixon & Vanderhye, P.C.

(57) ABSTRACT

A power control method in accordance with the present invention synchronizes the transmit power levels at the base stations currently serving a mobile station and an initial transmit power level of a new target base station being added in a diversity handover situation. At the beginning of the handover, a radio network controller orders the serving base stations to measure their respective transmit powers to the mobile station. Each serving base station then measures its transmit power to the mobile station and reports the power level measurements to the radio network controller. An initial transmit power setting is determined for the target base station, and new transmit power settings are determined for the serving base stations synchronized for example to a particular time ($t_0$). At or about synchronizing time $t_0$, the target base station transmits to the mobile station at the initial power setting, and at or about the same time, the serving base stations preferably also adjust their transmit powers toward the new values. Alternatively, the serving base stations transmit at their respective new values at or about time $t_0$. In a preferred embodiment of the present invention, the serving base station power adjustment is performed gradually.

35 Claims, 6 Drawing Sheets

U.S. PATENT DOCUMENTS

| | | | |
|---|---|---|---|
| 5,305,468 A | * 4/1994 | Bruckert et al. | 340/7.41 |
| 5,430,760 A | 7/1995 | Dent | |
| 5,487,180 A | * 1/1996 | Ohtake | 455/522 |
| 5,491,837 A | * 2/1996 | Haartsen | 455/62 |
| 5,551,057 A | 8/1996 | Mitra | |
| 5,574,982 A | 11/1996 | Almgren et al. | |
| 5,604,730 A | 2/1997 | Tiedemann, Jr. | |
| 5,652,748 A | * 7/1997 | Jolma et al. | 370/320 |
| 5,671,221 A | * 9/1997 | Yang | 370/320 |
| 5,684,793 A | * 11/1997 | Kiema et al. | 370/335 |
| 5,710,974 A | * 1/1998 | Granlund et al. | 455/33.2 |
| 5,710,982 A | 1/1998 | Laborde et al. | |
| 5,715,526 A | 2/1998 | Weaver, Jr. et al. | |
| 5,722,044 A | * 2/1998 | Padovani et al. | 455/443 |
| 5,799,004 A | * 8/1998 | Keskitalo et al. | 370/335 |
| 5,799,005 A | 8/1998 | Soliman | |
| 5,809,430 A | * 9/1998 | D'Amico | 455/525 |
| 5,839,056 A | * 11/1998 | Hakkinen | 455/522 |
| 5,862,489 A | * 1/1999 | Aalto | 455/522 |
| 5,864,578 A | * 1/1999 | Yuen | 375/200 |
| 5,884,176 A | * 3/1999 | Vaara | 455/438 |
| 5,884,187 A | * 3/1999 | Ziv et al. | 455/522 |
| 5,893,035 A | 4/1999 | Chen | |
| 5,926,503 A | * 7/1999 | Kelton et al. | 375/206 |
| 5,940,743 A | * 8/1999 | Sunay et al. | 370/331 |
| 6,034,635 A | * 3/2000 | Gilhousen | 342/457 |
| 6,038,450 A | * 3/2000 | Brink et al. | 455/442 |
| 6,070,084 A | * 5/2000 | Hamabe | 455/522 |
| 6,073,025 A | * 6/2000 | Chheda et al. | 455/522 |
| 6,078,813 A | * 6/2000 | Ljung | 455/436 |
| 6,085,108 A | * 7/2000 | Knutsson et al. | 455/522 |
| 6,097,947 A | * 8/2000 | Takai | 455/424 |
| 6,128,493 A | * 10/2000 | Song | 455/436 |
| 6,144,861 A | * 11/2000 | Sundelin et al. | 455/442 |
| 6,151,512 A | * 11/2000 | Chheda et al. | 455/562 |
| 6,163,696 A | * 12/2000 | Bi et al. | 455/436 |
| 6,173,162 B1 | * 1/2001 | Dahlman et al. | 455/69 |
| 6,175,745 B1 | * 1/2001 | Bringby et al. | 455/522 |

OTHER PUBLICATIONS

Power Control under Soft Handover, FPLMTS Study Committee, Air–interface WG, SWG2, Document No. AIF/SWG2–16–18 (P), Matsushita Communication Industrial Co., Ltd., Mar. 30, 1998.

Power Control under Soft Handover, FPLMTS Study Committe, Air–interface WG, SWG2, Document No. AIF/SWG2–15–2 (C), Matsushita Communication Industrial Co., Ltd., Mar. 11, 1998.

Excerpt from TIA/EIA Interim Standard Mobile Station–Base Station Compatibility Standard for Dual–Mode Wideband Spread Spectrum Cellular System, TIA/EIA/IS–95, Jul. 1993.

TSG–RAN Working Group 1 meeting #7bis, Kyongju, Korea, Oct. 4–5, 1999 entitled: Adjustment Loop in downlink power control during soft handover.

A Solution to the Power Drifting Problem in DHO, Oscar Salonaho, Nokia Research Center.

Derwent Abstract No. 95–384440, 1998, Transmission Power Control Method for CDMA System Reducing Transmission Power Quickly to Prevent Interference With Other Mobile Stations, e.g. Due to Change in Buildings Surrounding Mobile Station.

L. Song et al., Lucent Technologies, Adaptive Power Control Step Size, 1998.

A. Salmasi et al.: "On the System Design Aspects of Code Division Multiple Access (CDMA) Applied to Digital Cellular and Personal Communications Networks," Gateway to the Future –Technology in Motion, St. Louis, May 19–22, 1991, no. Conf. 41, May 19, 1991, pp. 57–62, XP000260154, Institute of Electrical and Electronics Engineers.

*Proceedings of the Vehicular Technology Conference*, Jun. 8, 10, 1994, vol. 1., No. CONF. 44, Jun. 8, 1994, pp. 41–45, XP0000496631, Institute of Electrical and Electronics Engineers, T. Andersson, "Tuning the Macro Diversity Performance in a DS–CDMA System".

* cited by examiner

BASE STATION TRANSMIT POWER CONTROL IN A CDMA CELLULAR TELEPHONE SYSTEM

RELATED APPLICATION

This application claims priority from U.S. Provisional Patent Applications Ser. Nos. 60/069,511, filed Dec. 15, 1997, and 60/090,236, filed Jun. 22, 1998.

FIELD OF THE INVENTION

The present invention relates to cellular telephone systems. More specifically, the present invention relates to base station transmit power control during handover situations in a code division multiple access cellular telephone system.

BACKGROUND AND SUMMARY OF THE INVENTION

In a cellular communications system, mobile radio stations communicate over respective radio channels to a base station. Several base stations are connected to a switching node which is typically connected to a gateway that interfaces the cellular communications system with other communications systems. A call placed from an external network to a mobile station is directed to the gateway, and from the gateway, through one or more switching nodes to the base station(s) which serve(s) the called mobile station. A base station pages the called mobile station and establishes a radio communications channel.

In a Code Division Multiple Access (CDMA) mobile communications system, the information transmitted between a base station and mobile station is modulated by a mathematical code, sometimes called a spreading code, in order to distinguish that information from information associated with other mobile stations or base stations that are using the same radio frequency band. Accordingly, individual radio "channels" are discriminated on the basis of these codes. Various aspects of CDMA are set forth in one or more textbooks such as *Applications of CDMA and Wireless/Personal Communications,* Garg, Vijay K. et al., Prentice-Hall (1997). Spread spectrum communications permit mobile transmissions to be received at two or more ("diverse") base stations and processed simultaneously to generate one received signal. With these combined signal processing capabilities, it is possible to perform a handover from one base station to another, (or from one antenna sector to another sector on the same base station), without any perceptible disturbance in the voice or data communications. This kind of handover is typically called "diversity handover". During diversity handover, the signaling and voice information from plural base stations is combined in a common point with decisions being made on the "quality" of the received data. Typically this common point is located at the switching node connected to the base stations. In the opposite direction, voice and signaling information are transmit from plural base stations, and a mobile station combines the results.

CDMA systems provide "soft" and "softer" diversity handover. In soft handover, as the mobile station moves to the edge of a cell, the adjacent cell's base station assigns a transceiver to the call while the current base station continues to handle the call. As a result, the call is handled by both base stations on a make-before-break basis. The soft diversity handover occurs with both base stations handling the call until the mobile station moves sufficiently close to one of the base stations which then exclusively handles the call. Softer diversity handover occurs when the mobile station is in handover between two different sectors at the same base station.

Because all users in a CDMA communications system transmit information using the same frequency band at the same time, each user's communications interferes with communications of the other users. In addition, signals received by a base station from a mobile station close to the base station are much stronger than signals received from other mobile stations located at the base station cell boundary. As a result, distant mobile communications are overshadowed and dominated by close-in mobile stations which is why this condition is sometimes referred to as the "near-far effect."

Therefore, to achieve increased capacity by decreasing unnecessary interference, all mobile-transmitted signals should arrive at a base station with about the same average power irrespective of their distance from the base station. Accordingly, uplink (or reverse) transmit power control (TPC) from the mobile station to the base station is one of the most significant factors in improving the performance and capacity of a CDMA system. In general, the mobile station attempts to control its transmit power based on the signal strength to generate a signal-to-noise (SNR) value (or other suitable measure) of signals received from a base station (open loop transmit power control), and the base station sends transmit power control messages to the mobile station (closed loop power control) with the end goal to control the power received at the base station to within a relatively small tolerance, e.g., 1 dB, for all mobile station transmissions received at that base station.

Downlink (or forward) transmit power control is also important for transmissions from the base station to the mobile station. Specifically, the base station varies its transmit power depending upon downlink transmit power control messages or commands sent by the mobile station. There are several reasons for downlink power control.

One reason for downlink transmit power control is to accommodate the fact that in certain coverage area locations, the downlink channel from base station to mobile station may be unusually poor. An example of such a location is a point where the path loss to one or two neighboring cells is nearly the same as the path loss to the base station communicating with the mobile station. At that location, the total interference is increased several times over the interference experienced by a mobile station at a point relatively close to the base station. An additional reason is that interference from these neighboring cell sites will not fade in unison with the desired signal. Still further, the mobile station may be located where several strong multipath signals arrive resulting in a relatively large interference. In other situations, the mobile station may be located where the signal-to-interference ratio is unusually good. Another reason for downlink power control is to minimize intercell interference caused by unnecessarily high base station transmit power levels. By varying the downlink power level to the minimum value needed to achieve a particular quality, unnecessary interference is avoided. If the downlink power level is fixed at a constant but high level to ensure minimum quality under poor conditions, much of the time the downlink power would be too high thereby causing needless interference. Such interference reduces cell capacity. In all of these cases, it is advantageous for the base station to raise or lower its transmit power to ensure acceptable quality but at the same time reduce to the extent possible interference to other signals.

Because power control in CDMA systems is important, transmit power control adjustments occur very frequently, e.g., every 0.625 milliseconds. In adjusting downlink transmit power, the mobile station is continually measuring the transmit power level received from the base station and determining whether that measured value is higher than a reference value. If so, one or more transmit power control bits having one value are transmit uplink from the mobile station to the base station to decrease the transmit power by a predetermined increment, e.g., 1 dB, down to a minimum transmit power value. On the other hand, when the measured value is lower than the reference value, one or more opposite value transmit power control bits are transmitted uplink to the base station to increase the transmit power by a predetermined increment, e.g., 1 dB, up to a maximum value. This transmit power control begins while uplink and downlink synchronization are being acquired and continues throughout the communication.

A problem arises in coordinating downlink transmit power levels among base stations at diversity handover. One problem is that during a handover, the transmit power command from the mobile station to the base stations involved in the handover may be erroneously received at one or more of the base stations. Another problem is that an offset between the downlink transmit powers of base stations involved in the soft handover can be quite large. Offset refers to the difference between the transmit power level of one (or more) base stations currently serving the mobile station and the power level of a new base station engaged in diversity handover with the mobile station. While an offset may or may not be desired for a particular application, it is difficult in either situation for the new base station to know the old base station's transmit power level when the new base station starts to transmit. Because transmit power is adjusted so rapidly, e.g., sixteen adjustments every 10 milliseconds, by the time a transmit power level is determined and delivered to the new/target handover base station based on a TPC command, the actual transmit power at one or more of the old serving base stations already serving the mobile station may have significantly changed during that time delay.

Consider the following scenario. At the beginning of a soft handover, transmit power level measurements from a serving base station and from a target base station to a mobile station are sent to a network node. The network node reads these transmit power measurement reports periodically, determines an appropriate power setting for the target base station—either the same power or a power at a specific desired offset, and sends the determined power setting to the target base station.

By the time that the target base station receives the determined transmit power from the network node, 100 msec up to one second of time may have transpired. During that one second, the serving base station transmit power level could have changed one hundred or even a thousand times because of the speed at which transmit power is adjusted, e.g., every 0.625 milliseconds. Hence, the determined transmit power command for the target base station is likely considerably offset from what that transmit power level should be at the time the command is actually received and implemented at the target base station, i.e., after a significant time delay.

What is needed is a way in which to compensate for or otherwise eliminate this undesired base station transmit power offset at handover. Moreover, the solution to the above-identified problem should preferably be a simple one that allows the mobile station to only transmit one set of power control commands to all of the base stations involved in the handover.

It is an object of the present invention to overcome the problems identified above, and in particular, to provide base station transmit power coordination technique that does not increase the complexity of the mobile station.

It is another object of the invention to eliminate erroneous transmit power settings including undesirable offset transmit power settings at base stations involved in a diversity handover.

It is a further object of the invention to compensate for drifting in the transmit power levels between base stations involved in diversity handover. For example, as a result of different error rates on the uplink control channels over which the mobile station transmits the same downlink power control command to these base stations, each base station ends up transmitting more or less different power levels depending on the respective bit error rates.

A power control method in accordance with the present invention synchronizes the transmit power levels at the base stations currently serving a mobile station and an initial transmit power level of a new target base station being added in a diversity handover situation. At the beginning of the handover, a radio network controller orders the serving base stations to detect their respective transmit powers to the mobile station. Each serving base station reports its transmit power (to the mobile station) to the radio network controller. The radio network controller determines an initial transmit power setting for the target base station and new transmit power settings for the serving base stations synchronized to a particular time ($t_0$). The initial and new transmit powers and the synchronizing time are provided to the respective base stations involved in the soft handover. The target base station transmits to the mobile station at the initial power setting, and the serving base stations adjust their transmit powers toward the new values. In a preferred, example embodiment of the present invention, the serving base station power adjustment is performed gradually with the target base station transmitting at the initial power setting and the serving base stations adjusting their transmit powers toward the new values at the synchronizing time $t_0$.

In another further example embodiment, a future synchronizing time may be employed and provided to all base stations to coordinate the transmit power levels so that desired values are reached at that synchronizing time. The invention may also be employed to periodically correct for drift in previously coordinated base station transmit power levels. Still further, the invention may be employed to control transmit power levels of different base station sectors involved in a softer handover.

BRIEF DESCRIPTION OF THE DRAWINGS

The foregoing and other objects, features, and advantages of the invention will be apparent from the following description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, data flows, techniques, etc. in order to provide a thorough understanding of the present invention. However, it will be apparent to one skilled in the art that the present invention may be practiced in other embodiments that depart from these specific details. For example, while the present invention may be applied to other handover situations such as "softer" diversity handover between base station antenna sectors, for purposes of explanation only, the following description is provided in a soft handover scenario. In other instances, detailed descriptions of well-known methods, interfaces, devices, and signaling techniques are omitted so as not to obscure the description of the present invention with unnecessary detail.

Figure 1:
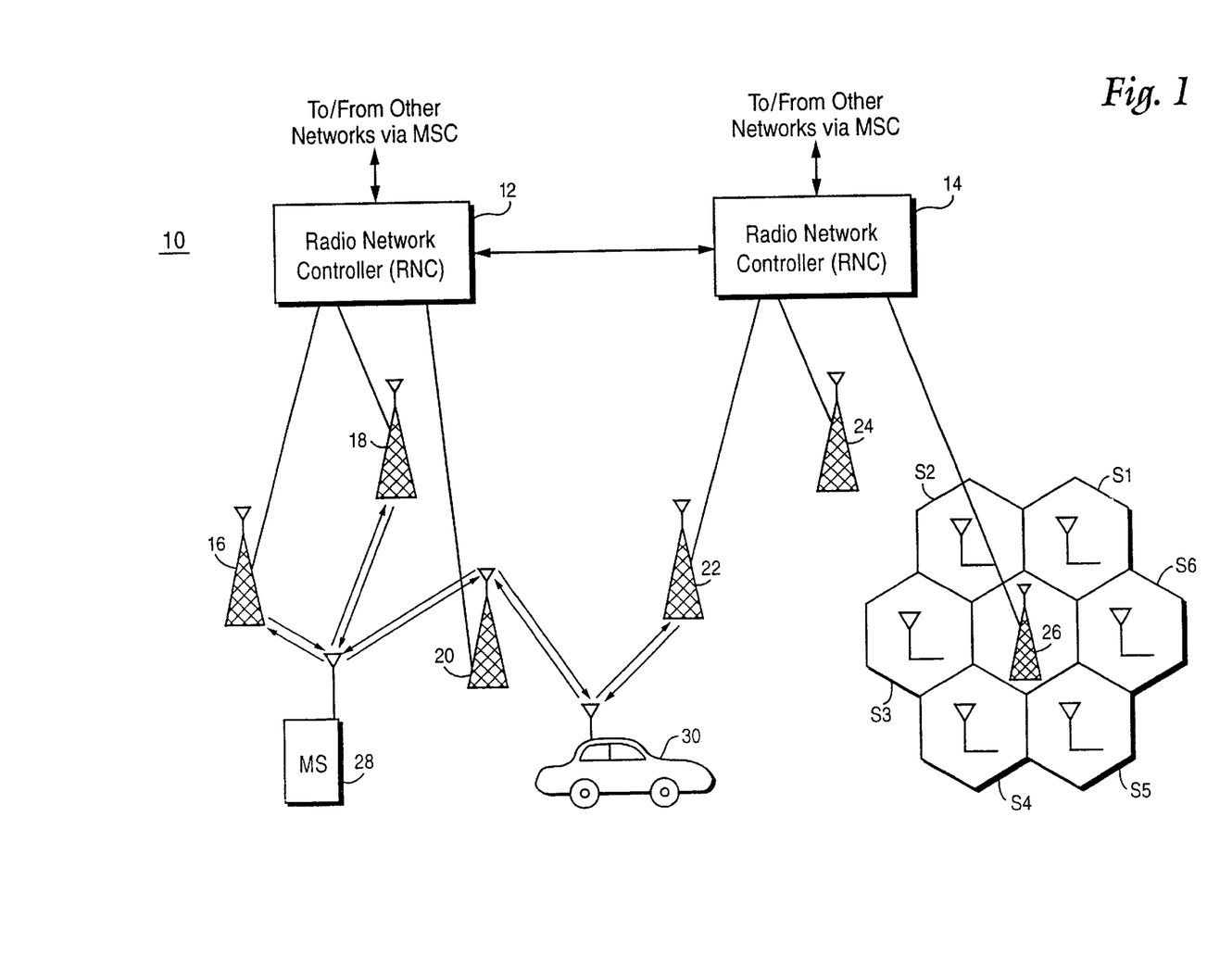
FIG. 1 is a schematic overview of an example mobile cellular communications system where the present invention may be employed.

FIG. 1 illustrates a mobile radio cellular communications system 10 which, in accordance with the preferred embodiment of the present invention, is a CDMA or wideband-CDMA communications system. Radio network controllers (RNCs) 12 and 14 control various radio network functions including for example radio access bearer setup, diversity handover, etc. Radio network controller 12 is coupled to a plurality of base stations 16, 18, and 20. Radio network controller 14 is connected to base stations 22, 24, and 26. Each base station serves a geographical area referred to as a cell, and a cell may be divided into plural sectors. Base station 26 is shown having six antenna sectors S1–S6. The base stations are connected to their corresponding radio network controller by various means such as dedicated telephone lines, optical fiber links, microwave links, etc. Both radio network controllers 12 and 14 are connected with external networks such as the Public Switched Telephone Network (PSTN), the Internet, etc. through one or more mobile switching centers (MSCs) (not shown). The RNC directs mobile station calls via the appropriate base station (s).

In FIG. 1, two example mobile stations 28 and 30 are shown communicating with plural base stations. Mobile station 28 is communicating with base stations 16, 18, and 20, and mobile station 30 is communicating with base stations 20 and 22. A control link between radio network controllers 12 and 14 permits diversity communications to/from mobile station 30 via base stations 20 and 22. Each radio communication channel established between the mobile station and a base station has an uplink component and a downlink component. As described above, since multiple communications utilize the same radio frequencies in code division multiple access (CDMA) communication, spreading codes along with other well known CDMA techniques are used to distinguish between the various mobile station and base station communications. For purposes of describing the example embodiment, the term channel typically refers to a CDMA channel which, for any mobile station, is defined in terms of an RF frequency and a particular code sequence.

Figure 2:
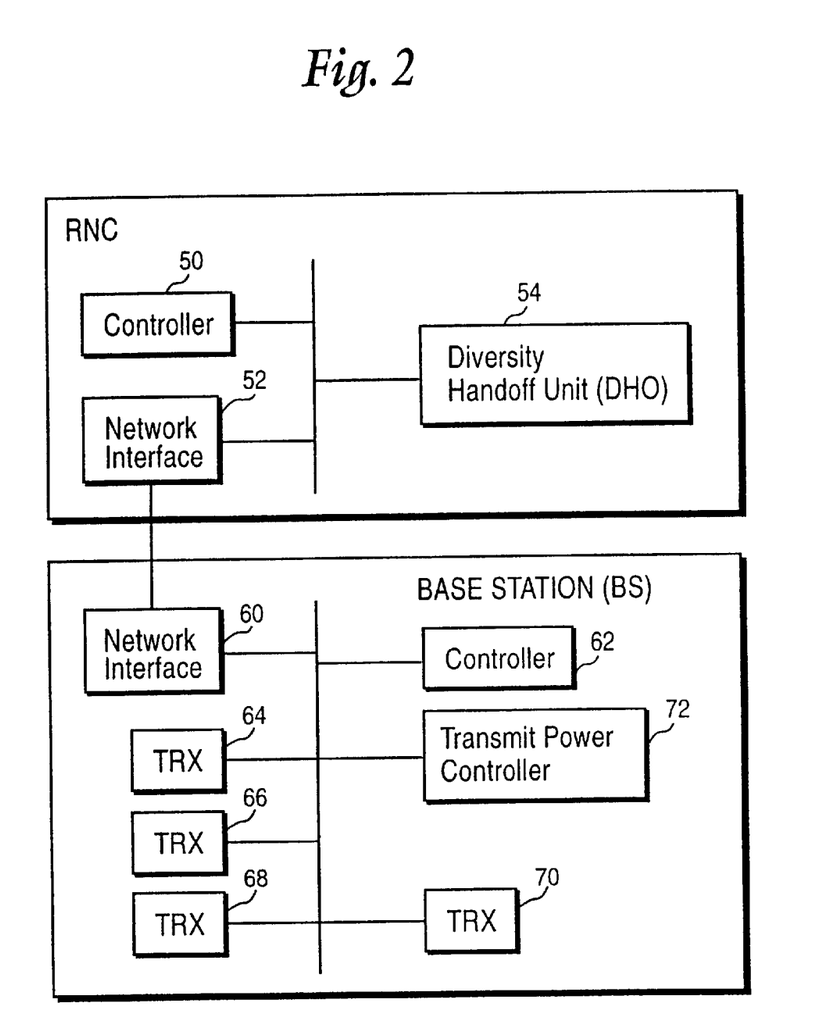
FIG. 2 is a function block diagram showing in more detail a radio network controller and a base station shown in FIG. 1.

Additional details of a base station and a radio network controller are now provided in conjunction with FIG. 2. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs numerous functions required for establishing, maintaining, and dropping diversity connections such as diversity combining, diversity splitting, power control and other link related radio resource control algorithms. Some of those DHO functions will be described in further detail below.

Each base station includes a corresponding network interface 60 for interfacing with the RNC. In addition, the base station includes a controller 62 connected to a plurality of transceivers (TRX) 64, 64, 68, and 70, as well as a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as a pilot signal. The common channel is monitored by mobile stations within or near that base station's cell, and is also used to request a working channel (uplink) or to page a mobile station (downlink). Transmit power controller 72 performs the open loop and closed loop power control procedures described in the background section above to control the transmit powers from all mobile transmissions received by the base station, e.g., so they are at approximately the same power level assuming all the mobiles are using the same type of service.

One of the advantages of CDMA communications is the use of diversity (both soft and softer) handover. Using soft handover as an example, as a mobile station moves to the edge of the current base station cell, the mobile station detects the power level of the common channel signaling (e.g., the pilot or perch signal) and determines that there is sufficient signal strength from that common signal for that base station to be a target base station (BS2) for handover. The mobile station sends a power measurement message to the serving base station (BS1) which then sends a handover request message to the RNC. The RNC accepts the handover request and sends an inter-base station handover request message to the target base station. The target base station assigns a transceiver to the call involving the mobile station while the serving base station continues to handle the call. The RNC combines the connections from the two base stations so that the handover is processed without a break, i.e., soft handover. This make-before-break handling of the call by two or more base stations occurs until the mobile station moves sufficiently close to one of the base stations or away from one of the base stations for the farther base station to be dropped.

Figure 3:
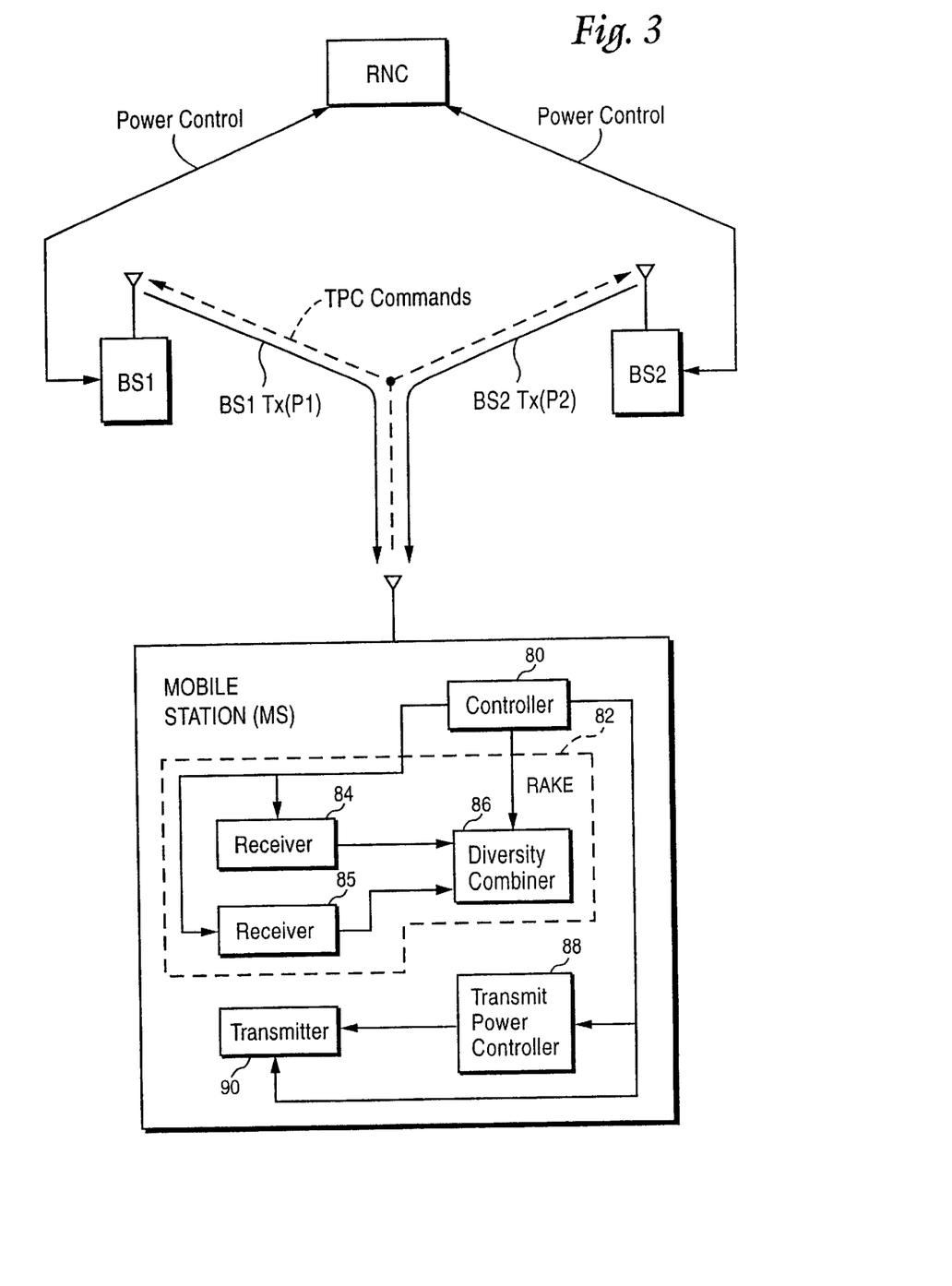
FIG. 3 is a function block diagram illustrating in more detail a mobile station shown in FIG. 1 as well as power control commands involving a mobile station, two base stations, and a radio network controller.

As described in the background, for fast power control, diversity handover poses some difficulty in coordinating/synchronizing the transmit power levels of the base stations/sectors involved. Reference is made to FIG. 3 to better understand the downlink power control synchronization issues addressed by the present invention at soft handover. Although multiple base stations may be involved in a diversity handover, and although more than one RNC may be involved in a diversity handover, such as illustrated in FIG. 1 with respect to communications between base station 20 and 22 and mobile station 30, the following description is simplified for purposes of illustration only to the scenario involving only two base stations BS1 and BS2 connected to the same RNC are involved in the diversity handover. As mentioned above, the present invention may also be applied employed to softer handover between base station sectors. If the sectors involved in the softer handover belong to the same base station, the RNC need not be involved with coordinating of the downlink power control provided by the base station.

The mobile station includes a controller 80 connected to a RAKE receiver 82, a transmit power controller 88, and a transmitter 90. RAKE receiver 82 includes plural receivers 84 and 85 (there may be additional receivers as well) connected to a diversity combiner 86. The transmissions from the two base stations BS1 and BS2 are received as multipaths in the receivers 84 and 85, combined in diversity combiner 86, and processed as one signal. Transmit power controller 88 detects the power level preferably as a signal to interference ratio $E_b/I_o$ of the received, diversity-combined signal.

The mobile station's transmit power controller 88 also responds to transmit uplink power control commands from the base stations BS1 and BS2 to adjust its uplink transmit power up or down by an appropriate increment in accordance with the received commands. Based upon the power level measurement of the diversity combined signal, the controller 80 generates transmit power control (TPC) commands and transmits them via transmitter 90 to both the serving base station BS1 and the target base station BS2. In accordance with one preferred embodiment of the invention, TPC commands include one or more bits which indicate a desired increase in transmit power, a desired decrease in transmit power, or no change in transmit power. Of course, any number of bits or bit assignments is possible and are contemplated by the present invention. Based upon the received TPC commands, BS1 and BS2 increase or decrease their transmit power by the corresponding increment, e.g., 0.5 or 1 dB.

As mentioned above, there are substantial problems in attempting to coordinate the current transmit power level of the serving base station BS1 when setting the initial power level of the new target base station at soft handover. In essence, during the time the RNC processes transmit power measurement messages from the serving base station BS1 to the mobile station, formulates an initial power setting for base station BS2, and communicates that initial power setting to base station BS2, the serving base station BS1 will have adjusted its transmit power many times in response to a large number of "fast" TPC commands received during that time period. Consequently, by the time the target base station BS2 begins transmitting, there is the possibility of a very large offset between the serving and target base station power levels. While the known power levels may differ in accordance with a desired, pre-established offset, in the preferred example embodiment, the target and serving base station transmit powers are approximately at the same power level. An example of the former situation is where the mobile station is considerably closer to a first base station than a second base station. Rather than have the farther base station transmit at a very high power level so that the measured levels of both base stations by the mobile are the same, interference is reduced and capacity increased by keeping the power level from the second base station at a lower level than the power level of the closer first base station.

In any event, it is desirable to have the serving and target base stations transmit at known power levels or known relative power level differences, i.e., the absolute power levels do not necessarily need to be known each time instant. The present invention achieves this desirable goal using a transmit power synchronization procedure. In general, the power levels of all base stations involved in a diversity handover are set to one or more predetermined levels at or for a specific time.

The transmit power synchronization procedure may be divided into five phases including:
  (1) determining a transmit power synchronization time ($t_0$) when the target base station will start transmitting to the mobile at the desired power setting and desired power levels for serving and target base stations based on mobile station power reports;
  (2) informing the new target base station of a desired power setting and the transmit power synchronization time ($t_0$);
  (3) informing the old serving base station(s) and the target base station of this desired power setting and the transmit power synchronization time ($t_0$);
  (4) checking the power level of the serving base station(s) at the synchronization time ($t_0$); and
  (5) adjusting the transmit power of the serving base station(s).

Each serving base station may as one option adjust its transmit power based on the difference between the desired power setting for the new target base station and the actual power setting of each serving base station at the transmit power synchronization time ($t_0$). A variation of the above procedure is to provide the synchronization time $t_0$ to all the base stations involved in the handover. Each base station may adjust its respective transmit power so that it is at the desired level at the synchronization time $t_0$.

The above procedures may also be used to re-synchronize transmit power levels of the base stations periodically after the initial synchronization to compensate for any "drift" in transmit power levels. As described above, such drifts may occur because the bit errors affecting the transmit power level (TPL) command received by one base station are likely not the same bit errors affecting the same TPL command sent to the second base station. This results in "different" received TPL commands rather than the same TPL command which produces drifting transmit power levels.

Figure 4:
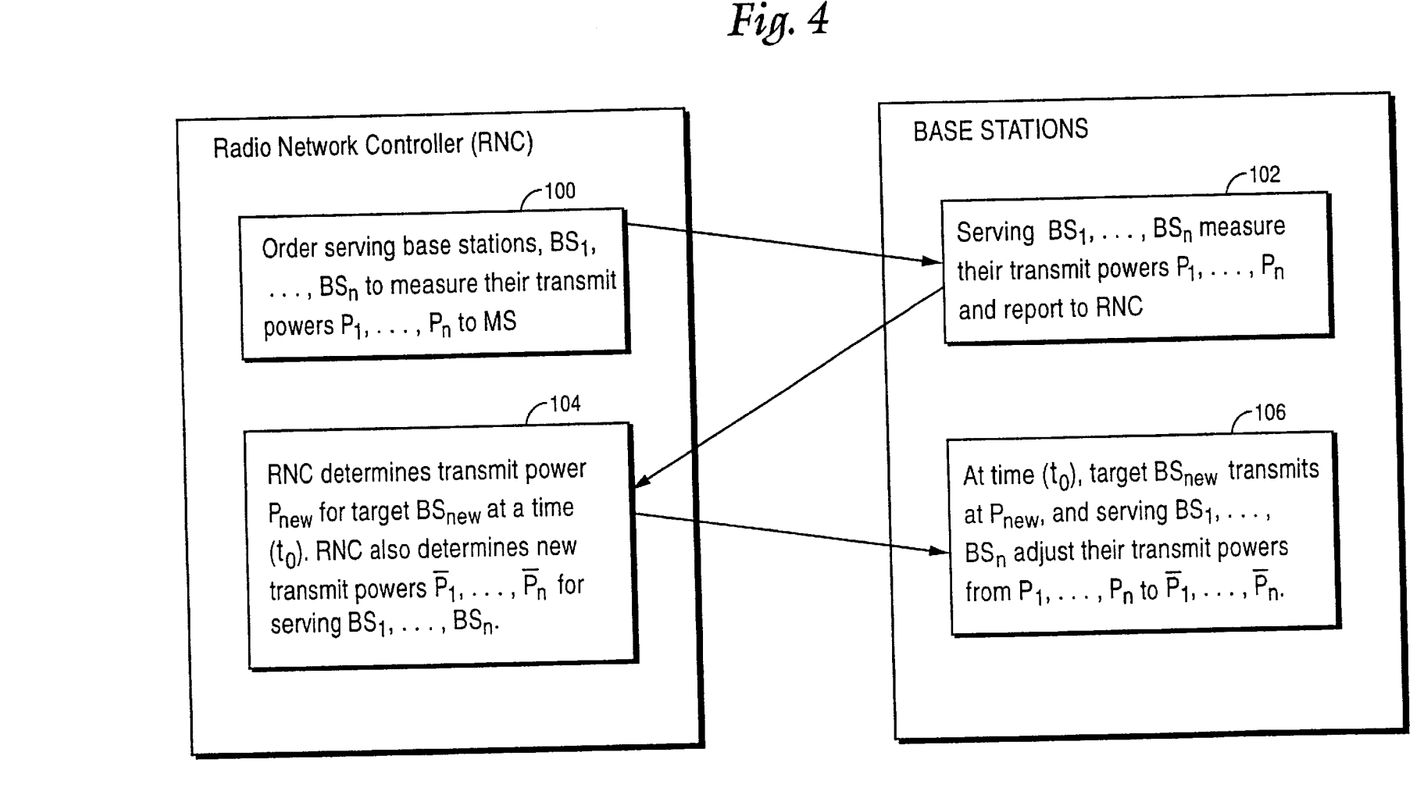
FIG. 4 is a diagram showing messages transmit between the radio network controller and the base stations to synchronize base station transmit power at soft handover in accordance with an example embodiment of the present invention.

FIG. 4 illustrates example procedures performed by the radio network controller and base stations involved in the soft handover example to achieve base station power synchronization in accordance with an example preferred embodiment of the present invention. First, the radio network controller orders each of the serving base stations $BS_1$, $BS_2$, ... $B_n$ to measure their respective transmit powers to the mobile station $P_1, P_2, \ldots, P_n$ and to report the measured results to the RNC (block 100). Each of the serving base stations measure their respective transmit powers $P_1$, $P_2, \ldots, P_n$ (perhaps in the form of $E_b/I_0$ values) and report their respective average transmit powers to the RNC (block 102). From those reports, the radio network controller determines the initial transmit power ($P_{new}$) for the target base station $BS_{new}$ to transmit at a transmit power synchronization time in the future ($t_0$).

The radio network controller also determines new transmit power settings $\overline{P}_1, \overline{P}_2, \ldots, \overline{P}_n$ for the serving base stations $BS_1, BS_2, \ldots, BS_n$ at time ($t_0$) (block 104). As already mentioned, in the preferred example embodiment, the initial target power setting and the new power settings for the serving base stations are the same. At synchronization time ($t_0$), the target base station $BS_{new}$ transmits at the initial power setting $P_{new}$. In addition, serving base stations $BS_1, BS_2, \ldots, BS_n$ adjust their transmit powers from their current transmit power values $P_1, P_2, \ldots, P_n$ at synchronization time ($t_0$) to the new power settings commanded by the RNC $\overline{P}_1, \overline{P}_2, \ldots, \overline{P}_n$ at synchronization time ($t_0$) (block 106). Rather than the radio network controller performing the power control operations, those power control operations can be performed in the respective base stations.

Figure 5:
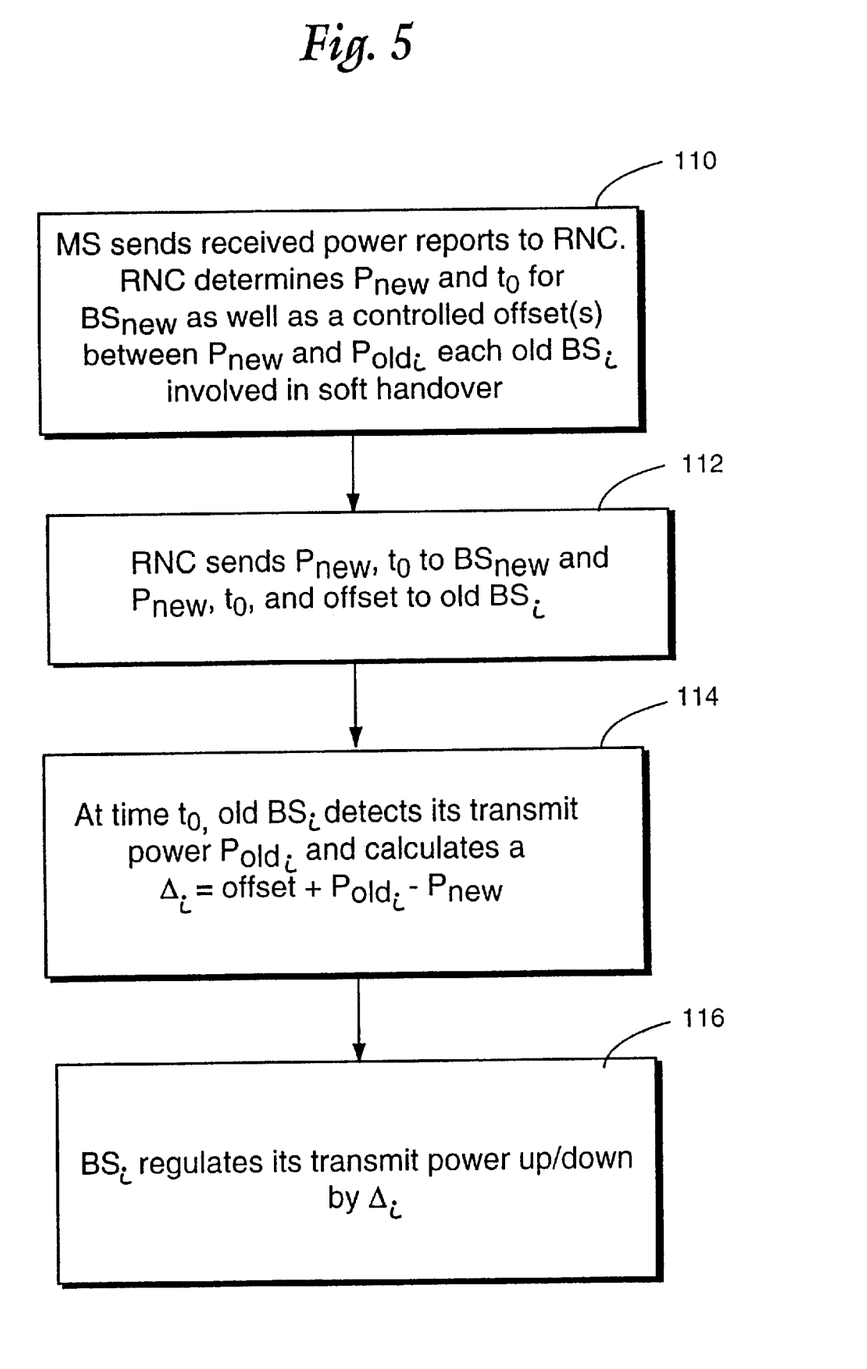
FIG. 5 is a flowchart illustrating alternative procedures for base station transmit power control.

An alternative procedure is described now in conjunction with FIG. 5. Rather than having the base stations measure their transmit powers to the mobile station, the mobile station measures the power level received from each base station and sends that received power to the RNC. The RNC then determines a new transmit power $P_{new}$ and synchronization time $t_0$ for the new base station $BS_{new}$ as well as one or more a controlled offsets (offset$_i$ corresponding to $BS_i$) between the new power $P_{new}$ and the old power $P_{oldi}$ of each old base station $BS_i$ involved in the soft handover (block 110). The RNC then sends $P_{new}$ and $t_0$ to the new base station $BS_{new}$ and $P_{new}$, $t_0$, and the offset$_i$ to each old base station $BS_i$ (block 112). At time $t_0$, each old base station $BS_i$ detects its transmit power $P_{oldi}$ and calculates an increment value $\Delta_i$=offset$_i$+$P_{oldi}$−$P_{new}$ (block 114). Each old base station then regulates its transmit power up or down by $\Delta_i$ (block 116).

While there are several different ways in which the difference between the old and new power settings of the serving base stations can be minimized or adjusted towards a desired offset, that adjustment preferably (though not necessarily) occurs gradually. Gradual adjustment is preferred when increasing power, and in particular, when the transmission is at a higher bit rate. This minimizes interference to the rest of the system. A preferred methodology of adjusting the power of the serving base stations is explained in conjunction with the flowchart routine Serving BS Power Adjustment (block 200) illustrated in flowchart format in FIG. 6.

Figure 6:
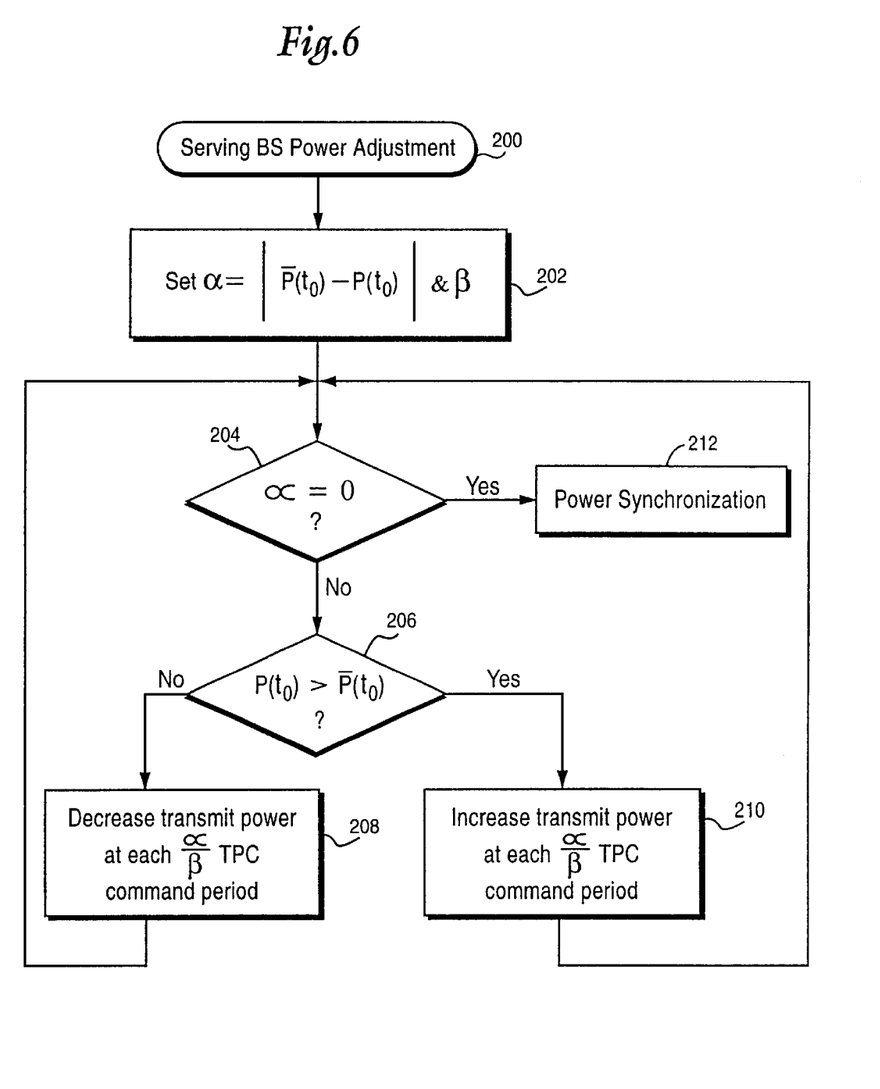
FIG. 6 is a flowchart diagram illustrating procedures for adjusting the base station power to newly-received transmit power commands from the radio network controller in accordance with an example preferred embodiment of the present invention.

The current power at each serving base station is represented by the variable $P(t_0)$, and the new transmit power at synchronization time ($t_0$) is represented by the variable $\overline{P}(t_0)$. A variable $\alpha$ is defined as the absolute value of the difference in the current and new power settings, i.e., $$\alpha=|\overline{P}(t_0)-P(t_0)|.$$

It is this difference that is ideally reduced to zero (or to a desired offset) at which time the serving and target base stations are synchronized in the sense that they are transmitting at approximately the same power level (or to a desired offset) to the mobile station at the same point in time. The value of parameter $\beta$ is also set in block 102 in accordance with the rate at which the difference is to be reduced. Two different values of $\beta$ can be employed: $\beta_{up}$ and $\beta_{down}$.

A decision is made in block 204 whether the power difference magnitude $\alpha$ is zero or approximately zero, i.e., within a deadband range. If so, a determination is made that transmit power synchronization is achieved between the target and serving base stations (block 212). Otherwise, a decision is made in block 206 whether the current base station transmit power at synchronization time ($t_0$) is greater than the desired power setting at that time. If not, the transmit power from that base station is increased gradually. Instead of increasing the transmit power at every possible power adjustment opportunity, i.e., upon receipt of every fast TPC command, the power is increased only at selected ones of those opportunities or periodically. Specifically, the power is incrementally increased only after $\alpha/\beta$ transmit power control commands are ignored. For incremental increases in transmit power, an example value for $\alpha/\beta$ is on the order of 1 dB.

Alternatively, if the current transmit power is less than the desired power at that time, the transmit power of the base station to the mobile station is decreased by the appropriate power adjustment increment at each $\alpha/\beta$ command (block 210). A suitable value for $\alpha/\beta$ in block 210 for the rate of power decrease is preferably selected so that power is decreased faster than it is increased, e.g., the power decrease is performed all in one step. Control returns to decision block 204 from either block 208 or 210 to determine whether power synchronization has been achieved or to repeat the adjustment process outlined above. By ignoring every $\alpha/\beta$ power adjustment command, the present invention ensures a gradual increase or decrease in power while at the same time minimizing any undesired power level difference.

Accordingly, the present invention achieves base station power synchronization at diversity handover without requiring additional complication of the mobile station. Moreover, the mobile station need only transmit one set of power control commands to all base stations/base station sectors involved in the handover. The invention may be applied at the initial power setting of a new base station becoming involved in a diversity handover as well as periodically during the diversity handover process to compensate for transmit power level drift. By providing such dynamic and coordinated downlink power control, unnecessary interference caused by high base station transmissions is minimized while still preserving a minimum power of communication. This improves the downlink system performance and optimizes capacity with respect to relative transmit power levels on the downlink.

Thus, while the present invention has been described in connection with what is presently considered to be the most practical and preferred embodiment, it is to be understood that the invention is not to be limited to the disclosed embodiment, but on the contrary, it is intended to cover various modifications and equivalent arrangements included within the spirit and scope of the appended claims. As mentioned above, while the present invention has been disclosed in the context of soft handover, the present invention could also be applied to other handover situations including for example softer handover.

What is claimed is:

1. A power control method for a mobile radio communications system including a controller connected to plural base stations, each base station communicating with mobile stations located within or near a geographical area associated with the base station, comprising:

for a call involving a mobile station, establishing an initial communication between the mobile station and a first base station with the first base station transmitting call traffic to the mobile station at a transmit power level over a first traffic channel;

for the same call, establishing a diversity handover communication between the mobile station and a second base station over a second traffic channel in addition to the initial communication;

determining an initial transmit power level for the second base station for the diversity handover communication transmissions from the second base station to the mobile station over the second traffic channel; and controlling the transmit power level of one of the first and second base stations to achieve a desired transmit power offset between the first and second power levels.

2. The method in claim 1, wherein the desired offset is zero.

3. The method in claim 1, wherein the desired offset is non-zero.

4. The method in claim 1, wherein signals received by the first and second base stations from the mobile station are diversity-combined in the controller and the signals received by the mobile station from the first and second base stations are diversity-combined in a RAKE receiver in the mobile station.

5. The method in claim 1, the controlling step further comprising:
gradually changing the transmit power level of one of the first and second base stations to reduce the difference between the first and second transmit power levels.

6. The method in claim 1, wherein the controlling step includes:
adjusting the transmit power levels of the first and second base stations to the same power level.

7. The method in claim 1, wherein the determining step further includes:
establishing a predetermined time associated with a desired transmit power level for the first base station over the first traffic channel and the initial transmit power level of the second base station over the second traffic channel.

8. The method in claim 7, the controlling step further comprising:
determining a difference between an actual transmit power level of the first base station at time $t_0$ and the desired transmit power level of the first base station at time $t_0$.

9. The method in claim 8, wherein if the difference exceeds a threshold, the controlling step further comprising:
comparing the actual and desired transmit power levels of the first base station;
if the actual transmit power level exceeds the desired transmit power level of the first base station, decreasing the power level; and
if the actual transmit power level is less than or equal to the desired transmit power level of the first base station, increasing the power level.

10. The method in claim 9, wherein the transmit power level of the first base station is changed incrementally with a first delay period between each incremental increase and a second delay period between each incremental decrease.

11. The method in claim 1, further comprising after the second base station is transmitting:
determining whether an undesired transmit power level offset exists between the first and second base station, and
controlling the transmit power level of one of the first and second base stations to reduce the undesired transmit power level offset.

12. Apparatus for use in a mobile communications system, comprising:
a first base station for establishing a communication with a mobile station with the first base station transmitting to the mobile station at a transmit power level over a first traffic channel;
a second base station for establishing a handover communication with the mobile station over a second traffic channel; and
a base station controller, coupled to the first and second base stations, for setting an initial power level for the second base station to transmit to the mobile station for the handover communication over the second traffic channel and adjusting the transmit power level of the first base station to the mobile station over the first traffic channel in conjunction with setting the initial power level of the second base station for the handover communication over the second traffic channel.

13. The apparatus in claim 12, wherein the base station controller includes a diversity handover unit for diversity combining signals corresponding to a communication from the mobile station received from the first and second base stations.

14. The apparatus in claim 12, wherein the transmit power level of the first base station may be adjusted towards the set initial power level of the second base station.

15. The apparatus in claim 12, wherein the transmit power level of the first base station is adjusted to a desired offset from the set initial power level of the second base station.

16. The apparatus in claim 12, wherein the first and second base stations each include a transmit power controller for varying the transmit power level of the base station to the mobile station.

17. The apparatus in claim 16, wherein one of the first and second base station transmit power controllers is configured to vary its base station transmit power in response to a transmit power level control signal from the base station controller.

18. The apparatus in claim 12, wherein the mobile station includes:
a RAKE receiver for diversity combining the signals received by the mobile station from the first and second base stations to generate a diversity combined received signal, and
a mobile station controller for measuring a parameter of the diversity combined received signal and transmitting to the first and second base stations a transmit power level control command to increase or decrease the transmit power based on the measured parameter.

19. The apparatus in claim 12, wherein the transmit power level of the first base station is adjustable to reduce a difference between the initial second transmit power level and the first transmit power level.

20. The apparatus in claim 12, wherein the base station controller is configured to gradually change the transmit power level of one of the first and second base stations.

21. The apparatus in claim 12, wherein the base station controller is configured to establish a predetermined synchronization time for the handover communication associated with desired transmit power levels for the first base station and the second base station over the first and second traffic channels, respectively.

22. The apparatus in claim 21, wherein the first base station is configured to determine a difference between an actual transmit power level of the first base station at synchronization time and a desired transmit power level of the first base station at synchronization time and adjust the first base station transmit power level over the first traffic channel to decrease the difference.

23. A method comprising coordinating a transmit power level of a serving base station transmitting to a mobile station over a first traffic channel with an initial transmit power level of a target base station transmitting to the mobile station in a diversity handover operation over a second traffic channel, wherein a new transmit power level is determined for the serving base station transmitting to the mobile station over the first traffic channel based on the initial power level of the target base station over the second traffic channel, and the initial and new transmit power levels are provided to the serving and target base stations with a predetermined synchronization time associated with the handover operation.

24. The method in claim 23 applied to a code division multiple access (CDMA) mobile communications system.

25. The method in claim 23 including coordinating respective transmit power levels of plural serving base stations supporting a soft handover communication with the mobile station with the initial transmit power level of the target base station.

26. The method in claim 23, further comprising adjusting the transmit power level at the serving base station to reduce a difference between an actual transmit power level at the predetermined synchronization time and the new transmit power level.

27. The method in claim 26, wherein the reduction is performed gradually.

28. The method in claim 23, further comprising adjusting the transmit power level at one or both of the serving and target base stations to reduce a difference between an actual transmit power level at the predetermined time and the new or initial transmit power level.

29. A power control method for a mobile radio communications system including a controller connected to plural base stations, each base station communicating with mobile stations located within or near a geographical area associated with the base station and having plural sectors each having one or more antennas, comprising:

for a call involving a mobile station, establishing an initial communication between the mobile station and a first sector with the first sector transmitting call traffic to the mobile station at a transmit power level over a first traffic channel;

for the same call, establishing a diversity handover communication between the mobile station and a second sector over a second traffic channel in addition to the initial communication;

determining an initial transmit power level for the second sector for the diversity handover communication transmissions from the second sector to the mobile station over the second traffic channel; and controlling the transmit power level of one of the first and second sectors to achieve a desired transmit power offset between the first and second power levels.

30. The method in claim 29, wherein the desired offset is approximately zero.

31. The method in claim 29, the controlling step further comprising:

gradually changing the transmit power level of one of the first and second sectors to reduce the difference between the first and second transmit power levels.

32. The method in claim 29, wherein the controlling step includes:

adjusting the transmit power levels of the first and second sectors to the same power level.

33. The method in claim 29, wherein the determining step further includes:

establishing a predetermined time ($t_0$) associated with a desired transmit power levels for the first sector over the first traffic channel and the initial transmit power level of the second sector over the second traffic channel.

34. The method in claim 33, the controlling step further comprising:

determining a difference between an actual transmit power level of the first sector at time $t_0$ and the desired transmit power level of the first sector at time $t_0$.

35. The method in claim 34, wherein if the difference exceeds a threshold, the controlling step further comprising:

comparing the and desired transmit power levels of the first sector;

if the actual transmit power level exceeds the desired transmit power level of the first sector, decreasing the power level of the first sector; and if the actual transmit power level is less than or equal to the desired transmit power level of the first sector, increasing the power level of the first sector.

* * * * *